US012629316B2

(12) United States Patent
Zhao et al.

(10) Patent No.: US 12,629,316 B2
(45) Date of Patent: May 19, 2026

(54) PULSE WALL NOZZLE FOR BATHTUB

(71) Applicant: Guangzhou Rising Dragon Recreation Industrial Co., Ltd., Guangzhou (CN)

(72) Inventors: Huaibin Zhao, Guangzhou (CN); Xuewen Liu, Guangzhou (CN)

(73) Assignee: GUANGZHOU RISING DRAGON RECREATION INDUSTRIAL CO., LTD., Guangzhou (CN)

(*) Notice: Subject to any disclaimer, the term of this patent is extended or adjusted under 35 U.S.C. 154(b) by 97 days.

(21) Appl. No.: 18/679,493

(22) Filed: May 31, 2024

(65) Prior Publication Data

US 2025/0177246 A1 Jun. 5, 2025

(30) Foreign Application Priority Data

Nov. 30, 2023 (CN) ........................ 202311630708.0

(51) Int. Cl.
*A61H 33/00* (2006.01)
*A61H 33/02* (2006.01)

(52) U.S. Cl.
CPC ....... *A61H 33/6063* (2013.01); *A61H 33/026* (2013.01); *A61H 33/6057* (2013.01)

(58) Field of Classification Search
CPC .......................... A61H 33/6063; A61H 33/026
USPC .......................................................... 4/541.4
See application file for complete search history.

(56) References Cited

U.S. PATENT DOCUMENTS 6,889,916 B2 * 5/2005 Loyd .................. A61H 33/6063 4/541.1
2003/0089797 A1 * 5/2003 Buck .................. A61H 33/6052 239/251
2010/0095449 A1 * 4/2010 Yu ...................... A61H 33/6063 4/541.6

* cited by examiner

*Primary Examiner* — Lauren A Crane
(74) *Attorney, Agent, or Firm* — Frank Niranjan

(57) ABSTRACT

A pulse wall nozzle for a bathtub includes a nozzle body provided with a water inlet, a nozzle cover provided with water spray holes and a rotating roller. The nozzle body cooperates with the nozzle cover to form a cyclone cavity. The rotating roller arranged in the cyclone cavity is capable of continuously rotating to result in constant change of water outlet positions, so that the massage range is wider. The pulsed water creates a powerful and rhythmic pulsed fluid. The massage effect is not only strong and profound, but also allows users to immerse themselves in a dynamic massage movement. Venturi suction is generated at the water spray hole, so that air and water at the water spray hole are mixed to form dense bubble water, which can enhance the strength and effect of pulse massage and provide pulse massage rich in bubbles.

15 Claims, 8 Drawing Sheets

PULSE WALL NOZZLE FOR BATHTUB

TECHNICAL FIELD

The present invention relates to the technical field of massage nozzles, in particular to a pulse wall nozzle for a bathtub.

BACKGROUND

With the improvement of people's quality of life, the demand for healthy and comfortable life is growing. Spa, massage bath and other comfortable bathroom experiences have become popular leisure ways in modern life. In the field of bathtub and massage facilities, the application of pulse nozzle has gradually become the mainstream trend of the market.

In the traditional bathtub massage nozzle mounted on a wall of the bathtub, its massage effect mainly depends on the fixed water outlet point and fixed water flow direction of the massage nozzle. There are some obvious limitations in this design. The most important thing is that the massage range is limited by the location of a single water outlet, which cannot meet the diverse needs of users for comprehensive massage. In addition, the traditional massage system usually adopts static water flow, that is, the water flow keeps pouring out from a fixed point, which makes the massage experience relatively simple and lacks movement and change. Therefore, in order to overcome the design limitations of the traditional bathtub massage nozzle, it is necessary to provide a more comprehensive, diversified and dynamic massage experience of the pulse wall nozzle.

SUMMARY

The present invention aims to provide a pulse wall nozzle for a bathtub, which solves the problems of fixed water outlet frequency, single massage mode and relatively small massage range of the traditional bathtub nozzle.

A pulse wall nozzle for a bathtub comprises a nozzle body, a nozzle cover and a rotating roller. The nozzle body is hollow inside and cooperates with the nozzle cover to form a cyclone cavity, and the nozzle body is provided with a water inlet. The nozzle cover is detachably installed on the nozzle body, a plurality of water spray holes is defined in a surface of the nozzle cover opposite from the nozzle body and are arranged in a length direction of the nozzle cover, and a side of the nozzle cover close to the water spray holes is provided with an air outlet facing the water spray holes. The rotating roller is rotatably arranged in the cyclone cavity, and water from the water inlet is capable of driving the rotating roller to rotate, so that the rotating roller rotationally cooperates with the water spray holes to control the water spray holes to generate pulsed fluid.

Preferably, the rotating roller comprises a plurality of quasi-cylindrical rotating units, and each rotating unit comprises a cylindrical surface and an arc surface; a radius of the arc surface is gradually reduced, and a maximum radius end of the arc surface is connected with an end of the cylindrical surface; a minimum radius end of the cylindrical surface is connected with an opposite end of the cylindrical surface through a connecting surface, and the connecting surfaces are arranged in a staggered manner.

Preferably, the connecting surfaces are parallel to an axis in a longitudinal direction of the rotating roller, and the connecting surfaces form spiral steps.

Preferably, ends adjacent connecting surfaces are connected to form a spiral structure.

Preferably, the rotating roller comprises a rotating shaft defining an axis of the rotating roller, bearings are arranged at two ends of the nozzle body in a length direction thereof, and the rotating shaft is rotatably arranged in the bearings.

Preferably, an air cavity cover plate is arranged at a side of the nozzle cover, an air cavity is formed between the nozzle cover and the air cavity cover plate; and an air inlet pipe is arranged on the air cavity cover plate, and the air outlet is arranged at an air outlet end of the air cavity, and the air outlet comprises a plurality of air outlet openings arranged along a length direction of the nozzle cover, and the air outlet openings correspond to the water spray holes one by one.

Preferably, the nozzle cover is provided with an accommodating groove at a position corresponding to the air outlet, and the accommodating groove is provided with a plurality of accommodating units corresponding to the rotating units, and each accommodating unit is provided with a ball accommodating piece; each ball accommodating piece defines a ball accommodating hole, and a side of the ball accommodating hole facing the air cavity is provided with an air outlet hole; and a ball is accommodated in the ball accommodating hole for controlling air to unidirectionally circulate from the air cavity to the nozzle cover.

Preferably, the nozzle body comprises a semi-arc-shaped accommodating part, and a side of a bottom of the semi-arc-shaped accommodating part is provided with a water cavity extending in a direction away from the opening side of the semi-arc-shaped accommodating part; and two water inlets are formed at bottoms of two sides of the water cavity in a communicating manner.

Preferably, the nozzle cover comprises a cover arc-shaped accommodating part adapted to the semi-arc-shaped accommodating part, a side of a top of the cover arc-shaped accommodating part is provided with a water outlet cavity extending in a direction away from the opening side of the semi-arc-shaped accommodating part, and a top of the water outlet cavity is provided with the plurality of water spray holes arranged in a straight line.

Preferably, the water spray holes are perpendicular to the air outlet.

Compared with the prior art, the present invention has the following beneficial effects: the present invention provides a pulse wall nozzle for a bathtub, which includes a nozzle body, a nozzle cover and a rotating roller. It breaks through the limitations of the traditional massage nozzle, and no longer takes the single-point massage form. Through the ingenious design of the rotating roller, the rotating roller continuously rotates to drive the constant change of the water outlet position, which makes the pulse massage effect spread, realizes the comprehensive massage coverage, makes the massage range wider, increases the diversity of massage functions, and further realizes the comprehensive and diversified massage feeling. At the same time, the movement form of pulsed water creates a powerful and rhythmic pulsed fluid, and the massage effect is not only strong and profound, but also allows users to immerse themselves in a dynamic massage movement. At the same time, Venturi suction is generated at the water spray holes, so that air and water at the water spray hole are mixed to form dense bubble water, which can enhance the strength and effect of pulse massage, provide pulse massage rich in bubbles, relieve muscle fatigue at the massage place and relieve the physical and mental pressure of users. Therefore, the pulse wall nozzle for a bathtub provides users with a more comprehensive and deep massage experience, which brings better massage effect and a sense of physical and mental relaxation.

IN THE DRAWINGS

1—Nozzle body, 2—Nozzle cover, 3—Rotating roller, 4—Cyclone cavity, 5—Bearing, 11—Water spray hole, 12—Water inlet, 21—Air outlet, 22—Air cavity cover plate, 23—Air inlet pipe, 24—Air cavity, 25—Accommodating groove, 26—Accommodating unit, 27—ball accommodating piece, 28—Ball accommodating hole, 29—Ball, 30—Air outlet hole, 31—Rotating unit, 32—Cylindrical surface, 33—Arc surface, 34—Connecting surface, 35—Connecting circular plate, 36—Rotating shaft, 13—Semi-arc-shaped accommodating part, 15—Water cavity, 201—Cover arc—shaped accommodating part, 202—Water outlet cavity.

DESCRIPTION OF EMBODIMENTS

The embodiments described below are only part of the embodiments of the present invention, but not all of them. Based on the embodiments in the present invention, all other embodiments obtained by those skilled in the art without creative work belong to the scope of protection of the present invention.

Embodiment 1

Figure 1:
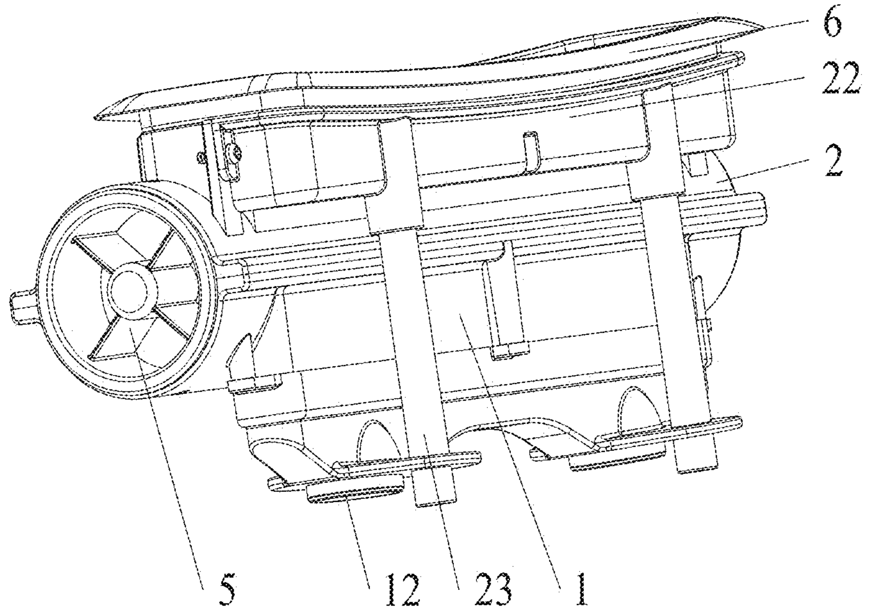
FIG. 1 is a schematic structural diagram of a pulse wall nozzle for a bathtub according to the present invention.
Figure 2:
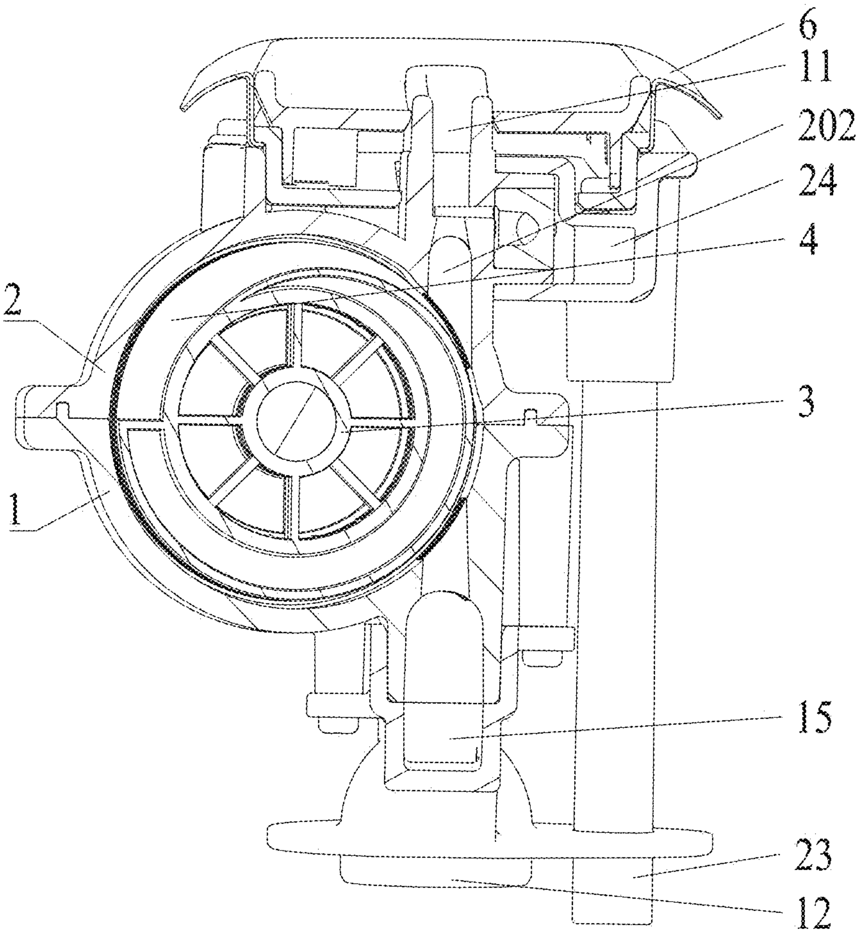
FIG. 2 is a schematic cross-sectional view of the pulse wall nozzle for a bathtub according to the present invention.
Figure 3:
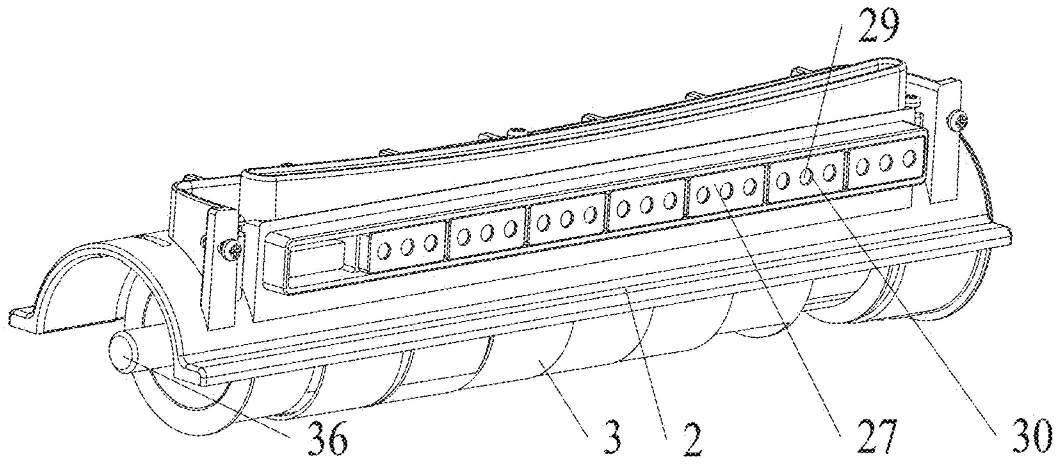
FIG. 3 is a partial structural schematic diagram of the pulse wall nozzle for a bathtub according to the present invention.
Figure 4:
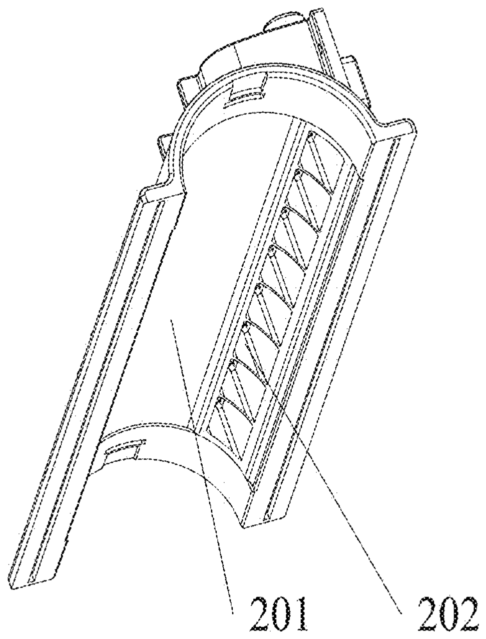
FIG. 4 is a schematic plan view of the nozzle cover according to the present invention.
Figure 5:
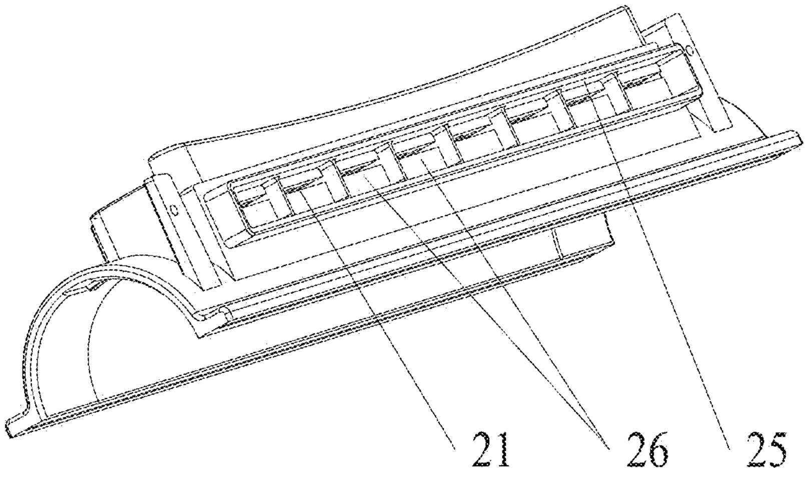
FIG. 5 is a schematic view of the side structure of the nozzle cover according to the present invention.
Figure 6:
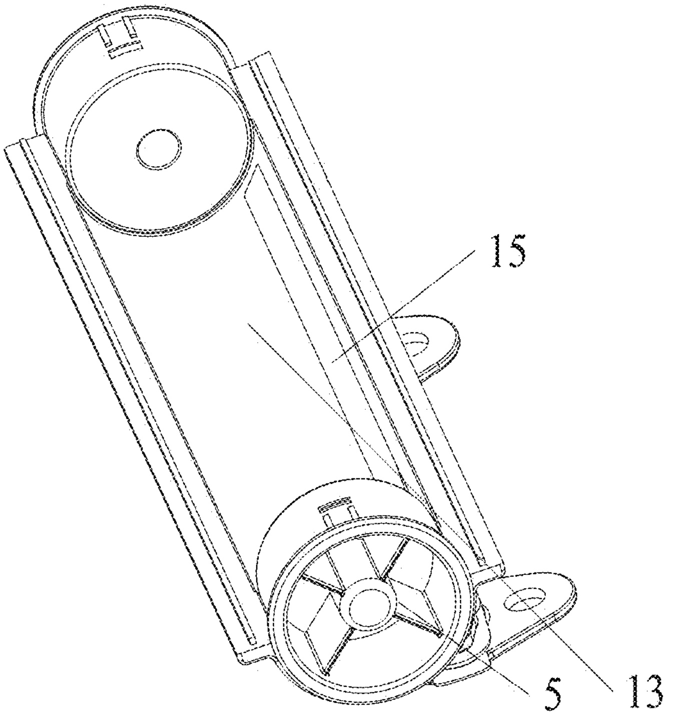
FIG. 6 is a schematic structural view of the nozzle body according to the present invention.
Figure 7:
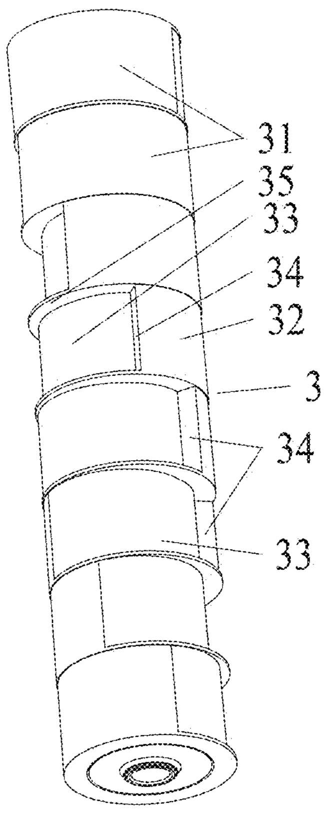
FIG. 7 is a schematic structural diagram of the rotating roller according to the present invention.
Figure 8:
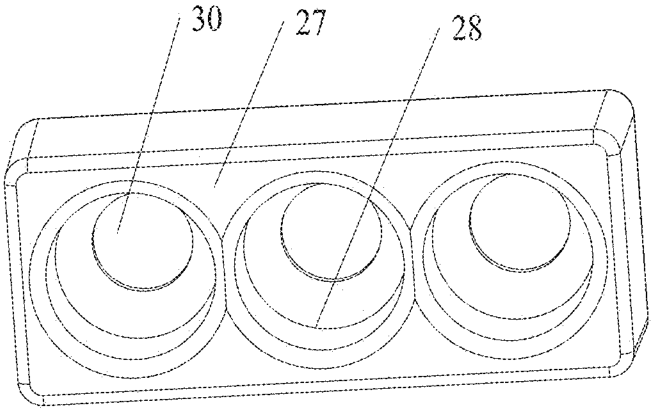
FIG. 8 is a schematic structural view of the ball accommodating piece according to the present invention.

Referring to FIG. 1 to FIG. 8, Embodiment 1 provides a pulse wall nozzle for a bathtub, which includes a nozzle body 1, a nozzle cover 2 and a rotating roller 3, wherein the nozzle body 1 is hollow inside and cooperates with the nozzle cover 2 to form a cyclone cavity 4, and the nozzle body 1 is provided with a water inlet 12. The nozzle cover 2 is detachably installed on the nozzle body 1, a plurality of water spray holes 11 are defined in a surface of the nozzle cover 2 opposite from the nozzle body 1 and arranged in a length direction of the surface of the nozzle cover 2 opposite from the nozzle body 1, and a side of the nozzle cover 2 close to the water spray holes 11 is provided with air outlet openings 21 facing the water spray holes 11. The rotating roller 3 is rotatably arranged in the cyclone cavity 4, and water entering from the water inlet 12 drives the rotating roller 3 to rotate, so that the rotating roller 3 rotationally cooperate with the water spray hole 11 to control the water spray hole 11 to generate pulsed fluid.

Specifically, the rotating roller 3 includes a plurality of quasi-cylindrical rotating units 31, and each rotating unit 31 comprises a cylindrical surface 32 and an arc surface 33 distributed around the axis of the rotating roller 3. A radius of the arc surface 33 is gradually reduced, a maximum radius end of the arc surface 33 is connected with one end of the cylindrical surface 32 and a minimum radius end of the cylindrical surface 32 is connected with the opposite end of the cylindrical surface 32 through a connecting surface 34. That is, the arc surface 33 extends from one circumferential end of the cylindrical surface 32 to the opposite circumferential end of the cylindrical surface 32. The connecting surfaces 34 are arranged in a staggered manner. In this embodiment, a connecting circular plate 35 is arranged at the joint of any two adjacent rotating units 31, and the radius of the connecting circular plate 35 is the same as that of the arc surface 33.

Optionally, the connecting surfaces 34 are parallel to the axis of the rotating roller 3 in the longitudinal direction, and the connecting surfaces 34 cooperatively form a spiral step. In this application, the projections of the connecting surfaces 34 can cooperatively form a circle, each connecting surface 34 is a point on the circle, and the included angles formed by the projected points of adjacent connecting surfaces 34 are equal. It should also be noted that in this application, the radius of the arc surface 33 is slightly smaller than that of the cyclone cavity 4.

Preferably, the rotating roller 3 is provided with a rotating shaft 36 which defines the axis of the rotating roller 3, two ends of the nozzle body 1 in the length direction thereof are provided with bearings 5, and the rotating shaft 36 is rotatably arranged in the bearing 5. In this application, the bearings 5 are clamped in two sides of the cyclone cavity 4, that is, the bearings 5 are provided with buckles, and the nozzle body 1 and the nozzle cover 2 are provided with slots matched with the buckles. When installing, the buckles on the bearings 5 can be buckled with the slots in the nozzle body 1 and the nozzle cover 2, which is also convenient for the disassembly and maintenance of the bearings 5.

Preferably, the side of the nozzle cover 2 is provided with an air cavity cover plate 22, an air cavity 24 is formed between the nozzle cover 2 and the air cavity cover plate 22. An air inlet pipe 23 is arranged on the air cavity cover plate 22; the air outlet end of the air cavity 24 is set as the air outlet 21, a plurality of air outlet openings 21 are arranged along the length direction of the nozzle cover 2, and the air outlet openings 21 are in one-to-one correspondence with the water spray holes 11. Since bubbles are formed in the closed air cavity 24 and are not affected by external interference, the bubbles can be discharged to the air outlet openings 21 with high density and durability. At the same time, the arrangement of a plurality of air outlet openings 21 enables air bubbles to be released uniformly, thus maintaining the consistency of massage effect.

Preferably, the nozzle cover 2 is provided with an accommodating groove 25 corresponding to the air outlet 21, and the accommodating groove 25 is provided with a plurality of accommodating units 26 corresponding to the rotating units 31. Each accommodating unit 26 is provided with a ball accommodating piece 27, and each ball accommodating piece 27 defines ball accommodating holes 28. The side of the ball accommodating hole 28 facing the air cavity 24 defines an air outlet hole 30. A ball 29 is accommodated in the ball accommodating hole 28 for controlling air to unidirectionally flow from the air cavity 24 to the nozzle cover 2, and the diameter of the air outlet hole 30 is smaller than that of the ball 29. When the water flow at the water spray hole 11 is discharged, the air in the air cavity 24 corresponding to the position of the water spray hole 11 will push the ball 29 away from the air outlet hole, and the air outlet hole is opened at this time, so that air bubbles can enter the water spray hole 11 and mix with the water to generate dense air bubbles. When there is no water flowing out from the water nozzle, the corresponding cavity is relatively closed, and at this time, the ball 29 is pushed by the water pressure, thus blocking the air outlet hole and effectively controlling the release of air bubbles. Therefore, this structure has the effect of one-way air circulation. Since the diameter of the air outlet hole is smaller than the diameter of the ball 29, the air outlet hole can be completely blocked, and water is prevented from entering the air cavity 24.

Preferably, the nozzle body 1 includes a semi-arc-shaped accommodating part 13, and the side of a bottom of the semi-arc-shaped accommodating part 13 is provided with a water cavity 15 extending toward a side of the semi-arc-shaped accommodating part 13 opposite to an opening side of the semi-arc-shaped accommodating part 13. Two water inlets 12 are respectively provided at the bottoms of the two sides of the water cavity 15 in a communicating manner. That is, the water inlets 12 are in communication with the water cavity 15. The arrangement of the water cavity 15 ensures that the water flow can be evenly distributed to the whole semi-arc-shaped accommodating part 13, which increases the stability and consistency of the water flow. At the same time, the arrangement of the two water inlets 12 provides enough water sources to ensure the strength and continuity of the massage water flow.

Preferably, the nozzle cover 2 includes a cover arc-shaped accommodating part 201 adapted to the semi-arc-shaped accommodating part, a side of a top of the cover arc-shaped accommodating part 201 is provided with a water outlet cavity 202 extending in a direction away from the opening side of the semi-arc-shaped accommodating part 13, and the top of the water outlet cavity 202 is provided with the plurality of water spray holes 11 arranged in a straight line. The arrangement of the water outlet cavity ensures the stability of the water flow, while the water spray holes 11 arranged in a straight line make the water flow distribution more uniform and enhance the massage effect.

Preferably, the water spray holes 11 are perpendicular to the air outlet openings 21, so that water and air can be better combined/mixed, and the Venturi effect can be better formed.

Preferably, the side of the nozzle cover 2 is provided with a decorative ring 6, and the decorative ring 6 is matched with the nozzle cover 2 to realize the installation of the pulse wall nozzle for the bathtub.

The rotating mode of the rotating roller 3 in the application is as follows: when water enters the water inlet 12, the water will provide a pressure to the side of the water spray hole 11, and at this time, the connecting surface 34 facing the water inlet 12 is impacted, thereby driving the whole rotating roller 3 to rotate toward the side of the water spray hole 11. Due to the structure of the cylindrical surface 32 and the arc surface 33 contained in the rotating unit 31, a gap will be generated between the arc surface 33 and the water spray hole 11, so that water can be sprayed from the side of the water spray hole 11; then, due to the rotation of the rotating roller 3, the last impacted connecting surface 34 is no longer facing the water inlet 12, and the next connecting surface 34 adjacent to it is driven to rotate to face the water inlet 12 and rotates as described above, and so on. After one cycle, the first connecting surface 34 faces the water inlet 12 again. Due to the radius of the cylindrical surface 32 is slightly smaller than that of the cyclone cavity 4, when the cylindrical surface 32 of the rotating unit 31 contacts the side wall of the cyclone cavity 4 near the water spray hole 11, the water spray hole 11 hardly sprays water, thus forming a better pulse water spray. At the water spray hole 11, the water will mix with the air from the air outlet 21, resulting in Venturi effect, which reduces the dilution and loss of bubbles in the process of water flow transmission, so that the water flow forms dense bubbles at the water spray hole 11, which has a better massage effect.

Therefore, the pulse wall nozzle for a bathtub provided by the present invention includes a nozzle body 1, a nozzle cover 2 and a rotating roller 3. It breaks through the limitations of the traditional massage nozzle, and is no longer a single-point massage form. Through the ingenious design of the rotating roller, the rotating roller continuously rotates to drive the constant change of the water outlet position, which makes the pulse massage effect spread, realizes the comprehensive massage coverage, makes the massage range wider, increases the diversity of massage functions, and further realizes the comprehensive and diversified massage feeling. At the same time, the movement form of pulsed water creates a powerful and rhythmic pulsed fluid, and the massage effect is not only strong and profound, but also allows users to immerse themselves in a dynamic massage movement.

At the same time, the side of the nozzle cover 2 close to the water spray hole 11 is provided with the air outlet 21 facing the water spray hole 11, and the water and air bubbles are combined to reduce the dilution and loss of air bubbles in the water flow transmission process, so that the water flow forms dense air bubbles at the water spray hole 11, which can further make the released massage water flow carry more dense air bubbles, enhance the massage strength and effect, provide pulse massage rich in air bubbles, and relieve muscle fatigue at the massage place. Therefore, the pulse wall nozzle for a bathtub provides users with a more comprehensive and deep massage experience, which brings better massage effect and a sense of physical and mental relaxation.

Embodiment 2

Embodiment 2 is basically the same as Embodiment 1, and the difference is that the rotating roller in Embodiment 2 includes a plurality of cylindrical rotating units, which include a cylindrical surface and an arc surface; the radius of the arc surface is gradually reduced, the maximum radius end of the arc surface is connected with the cylindrical surface, and the minimum radius end of the cylindrical surface is connected with the cylindrical surface through a connecting surface; and connecting surfaces are arranged in staggered manner. The ends of adjacent connecting surfaces are connected and form a spiral structure.

In the application, the water impacts the connecting surfaces of the spiral structure, so that the rotating roller rotates continuously, and a gap is generated between the arc surface and the water spray hole due to the rotation of the rotating roller, so that water is sprayed from the side of the water spray hole.

The preferred embodiments of the present invention disclosed above are only used to help explain the present invention, and are not limited to the specific embodiments described. Obviously, according to the contents of this specification, it can be modified and changed. The embodiment selected and specifically described in this specification is to better explain the principle and practical application of the present invention, so that the technicians in the technical field can better understand and make use of the present invention, and it is not a limitation of the present invention. Any solution after simple modification of the present invention shall belong to the protection scope of the present invention.

The invention claimed is:

1. A pulse wall nozzle for a bathtub, comprising a nozzle body, a nozzle cover and a rotating roller, wherein the nozzle body is hollow inside and cooperates with the nozzle cover to form a cyclone cavity, and the nozzle body is provided with a water inlet;

the nozzle cover is detachably installed on the nozzle body, a plurality of water spray holes is defined in a surface of the nozzle cover opposite from the nozzle body and arranged in a length direction of the nozzle cover, and a side of the nozzle cover close to the water spray holes is provided with an air outlet facing the water spray holes; and the rotating roller is rotatably arranged in the cyclone cavity, water from the water inlet is capable of driving the rotating roller to rotate in a circumferential direction, the rotating roller has a circumferential face, and a gap formed between the circumferential face and an inner wall of the cyclone cavity has a size which varies in the circumferential direction so that the rotating roller rotationally cooperates with the water spray holes to control the water spray holes to generate pulsed fluid.

2. The pulse wall nozzle for a bathtub according to claim 1, wherein the rotating roller comprises a plurality of quasi-cylindrical rotating units each of which comprises a cylindrical surface and an arc surface; a radius of the arc surface is gradually reduced, and a maximum radius end of the arc surface is connected with an end of the cylindrical surface; a minimum radius end of the cylindrical surface is connected with an opposite end of the cylindrical surface through a connecting surface, and the connecting surfaces are arranged in a staggered manner.

3. The pulse wall nozzle for a bathtub according to claim 2, wherein the connecting surfaces are parallel to an axis in a longitudinal direction of the rotating roller, and the connecting surfaces form spiral steps.

4. The pulse wall nozzle for a bathtub according to claim 2, wherein adjacent ends of the connecting surfaces are connected to form a spiral structure.

5. The pulse wall nozzle for a bathtub according to claim 1, wherein the rotating roller comprises a rotating shaft defining an axis of the rotating roller, bearings are arranged at two ends of the nozzle body in a length direction thereof, and the rotating shaft is rotatably arranged in the bearings.

6. The pulse wall nozzle for a bathtub according to claim 1, wherein an air cavity cover plate is arranged at a side of the nozzle cover, an air cavity is formed between the nozzle cover and the air cavity cover plate; and an air inlet pipe is arranged on the air cavity cover plate, and the air outlet is arranged at an air outlet end of the air cavity, and the air outlet comprises a plurality of air outlet openings arranged along the length direction of the nozzle cover, and the air outlet openings correspond to the water spray holes one by one.

7. The pulse wall nozzle for a bathtub according to claim 1, wherein the nozzle cover is provided with an accommodating groove at a position corresponding to the air outlet, and the accommodating groove is provided with a plurality of accommodating units corresponding to the rotating units, and each accommodating unit is provided with a ball accommodating piece; each ball accommodating piece defines a ball accommodating hole, and a side of each of the ball accommodating holes facing an air cavity is provided with an air outlet hole; and a ball is accommodated in each of the ball accommodating holes for controlling air to unidirectionally circulate from the air cavity to the nozzle cover.

8. The pulse wall nozzle for a bathtub according to claim 1, wherein the nozzle body comprises a semi-arc-shaped accommodating part, and a side of a bottom of the semi-arc-shaped accommodating part is provided with a water cavity extending in a direction away from an opening side of the semi-arc-shaped accommodating part; and two water inlets are formed at bottoms of two sides of the water cavity in a communicating manner.

9. The pulse wall nozzle for a bathtub according to claim 8, wherein the nozzle cover comprises a cover arc-shaped accommodating part adapted to the semi-arc-shaped accommodating part, a side of a top of the cover arc-shaped accommodating part is provided with a water outlet cavity extending in a direction away from the opening side of the semi-arc-shaped accommodating part, and a top of the water outlet cavity is provided with the plurality of water spray holes arranged in a straight line.

10. The pulse wall nozzle for a bathtub according to claim 1, wherein the water spray holes are perpendicular to the air outlet.

11. The pulse wall nozzle for a bathtub according to claim 1, wherein the circumferential face comprises a cylindrical surface and an arc surface distributed in the circumferential direction, and a radius of the arc surface is gradually reduced.

12. The pulse wall nozzle for a bathtub according to claim 11, wherein a maximum radius end of the arc surface is connected with an end of the cylindrical surface; and a minimum radius end of the cylindrical surface is connected with an opposite end of the cylindrical surface through a connecting surface.

13. The pulse wall nozzle for a bathtub according to claim 11, wherein the connecting surface is parallel to an axis in a longitudinal direction of the rotating roller.

14. A pulse wall nozzle for a bathtub, comprising a nozzle body, a nozzle cover and a rotating roller, wherein the nozzle body is hollow inside and cooperates with the nozzle cover to form a cyclone cavity, and the nozzle body is provided with a water inlet;

the nozzle cover is detachably installed on the nozzle body, a plurality of water spray holes is defined in a surface of the nozzle cover opposite from the nozzle body and arranged in a length direction of the nozzle cover, and a side of the nozzle cover close to the water spray holes is provided with an air outlet facing the water spray holes; and the rotating roller is rotatably arranged in the cyclone cavity, and water from the water inlet is capable of driving the rotating roller to rotate, so that the rotating roller rotationally cooperates with the water spray holes to control the water spray holes to generate pulsed fluid;

wherein the rotating roller comprises a plurality of quasi-cylindrical rotating units each of which comprises a cylindrical surface and an arc surface; a radius of the arc surface is gradually reduced, and a maximum radius end of the arc surface is connected with an end of the cylindrical surface; a minimum radius end of the cylindrical surface is connected with an opposite end of the cylindrical surface through a connecting surface, and the connecting surfaces are arranged in a staggered manner.

15. The pulse wall nozzle for a bathtub according to claim 14, wherein the connecting surfaces are parallel to an axis in a longitudinal direction of the rotating roller, and the connecting surfaces form spiral steps.

* * * * *